United States Patent
Gill

(10) Patent No.: US 7,382,588 B2
(45) Date of Patent: Jun. 3, 2008

(54) READ SENSOR HAVING A SELF-PINNED LAYER FORMED IN BOTH CENTRAL AND SIDE REGIONS FOR INCREASED THERMAL STABILITY

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 404 days.

(21) Appl. No.: 10/856,152

(22) Filed: May 28, 2004

(65) Prior Publication Data

US 2005/0264950 A1  Dec. 1, 2005

(51) Int. Cl.
G11B 5/33 (2006.01)
G11B 5/127 (2006.01)

(52) U.S. Cl. ............................ 360/324.11; 360/324.12; 360/324

(58) Field of Classification Search ................ 360/324, 360/324.11, 324.12, 314; 428/811.2, 811.3
See application file for complete search history.

(56) References Cited

U.S. PATENT DOCUMENTS

| 6,388,847 | B1 | 5/2002 | Horng et al. | |
|---|---|---|---|---|
| 6,538,858 | B1 * | 3/2003 | Hasegawa et al. | 360/324.12 |
| 6,620,530 | B1 | 9/2003 | Li et al. | |
| 6,893,740 | B2 * | 5/2005 | Saito | 428/668 |
| 6,952,328 | B2 * | 10/2005 | Hasegawa | 360/324.12 |
| 7,035,059 | B2 * | 4/2006 | Gill | 360/324.11 |
| 7,106,561 | B2 * | 9/2006 | Carey et al. | 360/324.12 |
| 7,199,984 | B2 * | 4/2007 | Carey et al. | 360/324.12 |
| 2002/0159198 | A1 | 10/2002 | Pinarbasi | |
| 2003/0030946 | A1 | 2/2003 | Hasegawa | |
| 2003/0043503 | A1 | 3/2003 | Grigoryevich et al. | |
| 2003/0058587 | A1 * | 3/2003 | Hasegawa et al. | 360/324.12 |
| 2003/0086217 | A1 | 5/2003 | Pinarbasi | |
| 2003/0103299 | A1 * | 6/2003 | Saito | 360/324.12 |
| 2003/0179513 | A1 * | 9/2003 | Pinarbasi | 360/324.11 |
| 2003/0179515 | A1 * | 9/2003 | Pinarbasi | 360/324.11 |
| 2003/0231436 | A1 | 12/2003 | Nishiyama | |
| 2004/0008454 | A1 * | 1/2004 | Gill | 360/324.12 |
| 2004/0008455 | A1 * | 1/2004 | Hasegawa et al. | 360/324.12 |
| 2004/0120082 | A1 * | 6/2004 | Ikegami et al. | 360/324.11 |

FOREIGN PATENT DOCUMENTS

GB 2390169 A * 12/2003
GB 2413856 A * 11/2005

* cited by examiner

*Primary Examiner*—Andrea Wellington
*Assistant Examiner*—Adam B Dravininkas
(74) *Attorney, Agent, or Firm*—John J. Oskorep, Esq.; Rambod Nader

(57) ABSTRACT

A magnetic head includes first and second shield layers and a read sensor formed between and in electrical contact with the first and second shield layers. The read sensor includes a free layer structure; an antiparallel (AP) self-pinned structure which includes a first AP self-pinned layer, a second AP self-pinned layer, and an AP coupling layer formed between the first and the second AP self-pinned layers; and a non-magnetic spacer layer formed between the free layer structure and the AP self-pinned structure. The first AP self-pinned layer is formed in both a central region of the read sensor and in side regions adjacent the central region. Since thermal stability of the first AP self-pinned layer is proportional to its volume, extending the first AP self-pinned layer in the side regions improves the thermal stability to reduce the likelihood of amplitude flip in the self-pinned sensor.

25 Claims, 9 Drawing Sheets

READ SENSOR HAVING A SELF-PINNED LAYER FORMED IN BOTH CENTRAL AND SIDE REGIONS FOR INCREASED THERMAL STABILITY

BACKGROUND OF THE INVENTION

1. Field of the Invention

The present invention relates generally to read sensors of magnetic heads in data storage devices, and more particularly to "self-pinned" sensors of the current-perpendicular-to-the-planes (CP) type or the tunnel valve type which have an antiparallel (GAP) self-pinned structure with an GAP self-pinned layer formed in both the central active sensor region and the side regions outside the central region to increase its thermal stability and reduce the likelihood of amplitude flip.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces. Magnetic heads which include read sensors are then used to read data from the tracks on the disk surfaces.

In high capacity disk drives, magneto resistive (MR) Read sensors, commonly referred to as MR Heads, may be used to read data from a surface of a disk at greater linear densities than thin film inductive heads. An MR Sensor detects a magnetic field through the change in the resistance of its MR Sensing layer (also referred to as an "MR Element") as a function of the strength and direction of the magnetic flux being sensed by the MR Layer. The conventional MR Sensor operates on the basis of the anisotropic magnetoresistive (AMR) effect in which the MR Element resistance varies as the square of the cosine of the angle between the magnetization of the MR Element and the direction of sense current flow through the MR Element. Recorded data can be read from a magnetic medium because the external magnetic field from the recorded magnetic medium (the signal field) causes a change in the direction of magnetization in the MR element, which in turn causes a change in resistance in the MR Element and a corresponding change in the sensed current or voltage. Within the general category of MR Sensors is the giant magneto resistance (GMR) sensor manifesting the GMR effect. In GMR sensors, the resistance of the MR Sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. GMR sensors using only two layers of ferromagnetic material (e.g. Nickel-iron, cobalt-iron, or nickel-iron-cobalt) separated by a layer of nonmagnetic material (e.g. Copper) are generally referred to as spin valve (SV) sensors manifesting the SV effect.

One of the ferromagnetic (FM) layers referred to as the pinned layer has its magnetization typically pinned by exchange coupling with an antiferromagnetic (AFM) layer (e.g., nickel-oxide, iron-manganese, or platinum-manganese). The pinning field generated by the AFM pinning layer should be greater than demagnetizing fields to ensure that the magnetization direction of the pinned layer remains fixed during application of external fields (e.g. fields from bits recorded on the disk). The magnetization of the other FM layer referred to as the free layer, however, is not fixed and is free to rotate in response to the field from the information recorded on the magnetic medium (the signal field). The pinned layer may be part of an antiparallel (AP) pinned structure which includes an antiparallel coupling (APC) layer formed between first and second AP pinned layers. The first AP pinned layer, for example, may be the layer that is exchange coupled to and pinned by the AFM pinning layer. By strong antiparallel coupling between the first and second AP pinned layers, the magnetic moment of the second AP pinned layer is made antiparallel to the magnetic moment of the first AP pinned layer.

Sensors are classified as a bottom sensor or a top sensor depending upon whether the pinned layer is located near the bottom of the sensor close to the first read gap layer or near the top of the sensor close to the second read gap layer. Sensors are further classified as simple pinned or AP pinned depending upon whether the pinned structure is one or more FM layers with a unidirectional magnetic moment or a pair of AP pinned layers separated by the APC layer with magnetic moments of the AP pinned layers being antiparallel. Sensors are still further classified as single or dual wherein a single sensor employs only one pinned layer and a dual sensor employs two pinned layers with the free layer structure located therebetween.

A read sensor may also be of a current-perpendicular-to-the-planes (CPP) type in which current flows perpendicular to the major planes of the sensor layers. First and second shield layers engage the bottom and the top, respectively, of the sensor so as to simultaneously serve as electrically conductive leads for the sensor. The CPP sensor may be contrasted with a current-in-parallel-to-the-planes (CIP) type sensor in which the current is conducted in planes parallel to the major thin film planes of the sensor. In a CPP sensor, when the spacer layer between the free layer and the AP pinned structure is nonmagnetic and electrically conductive (such as copper), the current is referred to as a "sense current"; however when the spacer layer is nonmagnetic and electrically nonconductive (such as aluminum oxide), the current is referred to as a "tunneling current". Hereinafter, the current is referred to as a perpendicular current $I_p$ which can be either a sense current or a tunneling current.

When the magnetic moments of the pinned and free layers are parallel with respect to one another the resistance of the sensor to the perpendicular current $I_p$ is at a minimum, and when their magnetic moments are antiparallel the resistance of the sensor to the perpendicular current $I_p$ is at a maximum. A change in resistance of the sensor is a function of cosine $\theta$, where $\theta$ is the angle between the magnetic moments of the pinned and free layers. When the perpendicular current $I_p$ is conducted through the sensor, resistance changes, due to field signals from the rotating magnetic disk, cause potential changes that are detected and processed as playback signals. The sensitivity of the sensor is quantified with a magneto resistive coefficient $\Delta r/R$, where $\Delta r$ is the change in resistance of the sensor from minimum resistance (magnetic moments of free and pinned layers parallel) to maximum resistance (magnetic moments of the free and pinned layers antiparallel) and R is the resistance of the sensor at minimum resistance.

It should be understood that a narrow track width is important for promoting the track width density of the read head. The more narrow the track width the greater the number of tracks that can be read per linear inch along a radius of the rotating magnetic disk. This enables an increase in the magnetic storage capacity of the disk drive. It should also be understood that the thinner the read gap length, the higher the linear read bit density of the read head. The read gap is the length of the sensor between the first and second shield layers. A relatively thin read gap length means that more bits can be read per inch along the track of a rotating magnetic disk which enables an increase in the storage capacity of the magnetic disk drive.

Assuming that the aforementioned AFM pinning layer is platinum manganese (PtMn), the pinning layer has a thickness of approximately 150 Å. This thickness adversely impacts the linear read bit density of the read head. Further, the pinning layer significantly increases the resistance R of the sensor to the perpendicular current $I_p$. The result is that the magneto resistive coefficient $\Delta r/R$ of the sensor is decreased. The pinning layer also requires extra steps in their fabrication and a setting process. It is also important that the free layer be longitudinally biased parallel to the ABS and parallel to the major planes of the thin film layers of the sensor in order to magnetically stabilize the free layer. This is typically accomplished by first and second hard bias magnetic layers which abut first and second sides of the sensor. Unfortunately, the magnetic field through the free layer between the first and second sides is not uniform since a portion of the magnetization is lost in a central region of the free layer to the shield layers. This is especially troublesome when the track width of the sensor is of sub-micron dimensions. End portions of the free layer which abut the hard bias layers are over-biased and become very stiff in their response to field signals from the rotating magnetic disk. The stiffened end portions can take up a large portion of the total length of a sub-micron sensor and can significantly reduce the amplitude of the sensor.

Instead of having an AFM pinning layer which pins the AP pinned structure, the read sensor may alternatively have an AP "self-pinned" structure. A read sensor of the self-pinned type relies on magnetostriction of the AP self-pinned structure and the ABS stress for a self-pinning effect. The AFM pinning layer, which is typically as thick as 150 Angstroms, is no longer necessary for pinning purposes so that a relatively thin sensor can be advantageously fabricated. A self-pinned structure can achieve higher bit densities with its thinner profile and increased sensitivity.

For self-pinned sensors, it has been necessary to improve the magnetic pinning field in order to prevent amplitude flipping. During disk drive operation, readback signals from the disk are detected as either a "0" or "1" depending on the polarity of the bits recorded on the disk. When an undesirable head-to-disk interaction occurs (e.g. from defects, asperities, bumps, etc.), the sensor experiences compressive or tensile stress which may cause the pinned layers to flip orientation. Electrical overstress (EOS) from electrostatic discharge (ESD) in the sensor during manufacturing and/or handling may also induce such flipping. If the sensor is of the CPP type, current flows through the sensor in a direction that is perpendicular to the layers which increases the sensor's temperature, to thereby produce a source of thermal stress which further contributes to the likelihood of amplitude flip. Due to these sources of stress, the pinned layers may flip their direction either permanently or semi-permanently depending on the severity of the stress. This causes the amplitude of the readback signal to flip (hence the terminology "amplitude flip"), which results in corrupt data.

Accordingly, there is an existing need to overcome these and other deficiencies of the prior art.

SUMMARY

A magnetic head includes first and second shield layers and a read sensor formed between and in electrical contact with the first and second shield layers, where the read sensor is of the current-perpendicular-to-the-planes (CPP) type or tunnel valve type. The read sensor includes a free layer structure; an antiparallel (AP) self-pinned structure which includes a first AP self-pinned layer, a second AP self-pinned layer, and an AP coupling layer formed between the first and the second AP self-pinned layers; and a non-magnetic spacer layer formed between the free layer structure and the AP self-pinned structure. The first AP self-pinned layer is formed in both a central region of the read sensor and in side regions adjacent the central region. Since thermal stability of the first AP self-pinned layer is proportional to its volume, extending the first AP self-pinned layer in the side regions improves the thermal stability to reduce the likelihood of amplitude flip in the self-pinned sensor. Preferably, an in-stack biasing structure is formed in the central region for stabilizing the free layer structure.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

A magnetic head includes first and second shield layers and a read sensor formed between and in electrical contact with the first and second shield layers, where the read sensor is of the current-perpendicular-to-the-planes (CPP) type or tunnel valve type. The read sensor includes a free layer structure; an antiparallel (AP) self-pinned structure which includes a first AP self-pinned layer, a second AP self-pinned layer, and an AP coupling layer formed between the first and the second AP self-pinned layers; and a non-magnetic spacer layer formed between the free layer structure and the AP self-pinned structure. The first AP self-pinned layer is formed in both a central region of the read sensor and in side regions adjacent the central region. Since thermal stability of the first AP self-pinned layer is proportional to its volume, extending the first AP self-pinned layer in the side regions improves the thermal stability to reduce the likelihood of amplitude flip in the self-pinned sensor. Preferably, an in-stack biasing structure is formed in the central region for stabilizing the free layer structure.

Figure 1:
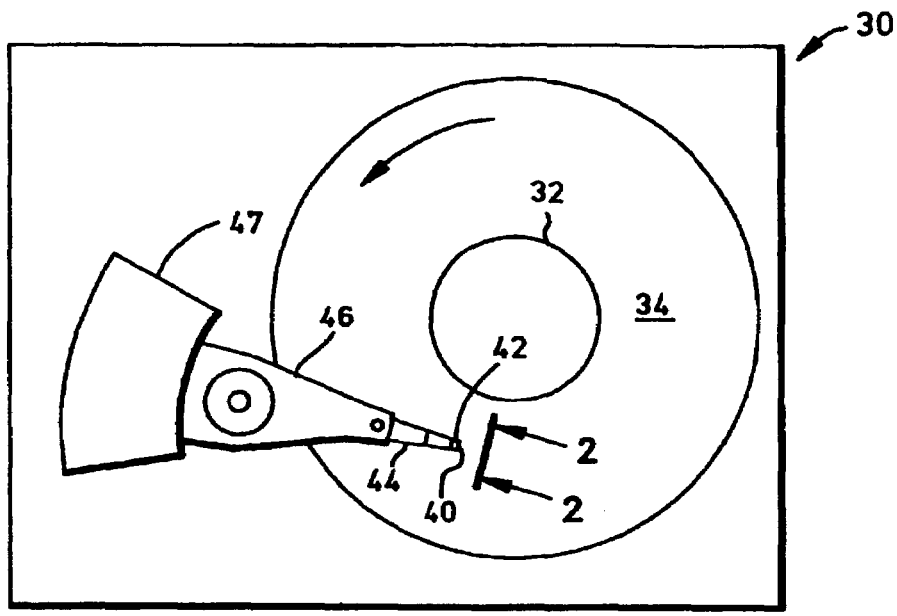
FIG. 1 is a plan view of an exemplary prior art magnetic disk drive.
Figure 2:
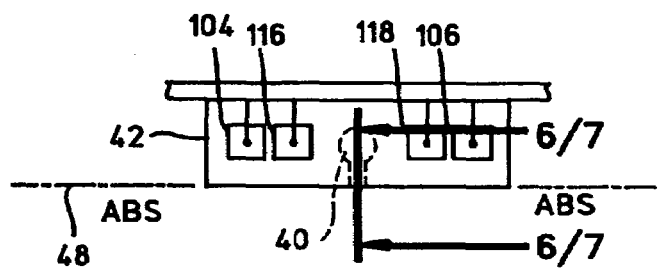
FIG. 2 is an end view of a slider with a magnetic head of the disk drive as seen in plane 2-2 of FIG. 1.
Figure 3:
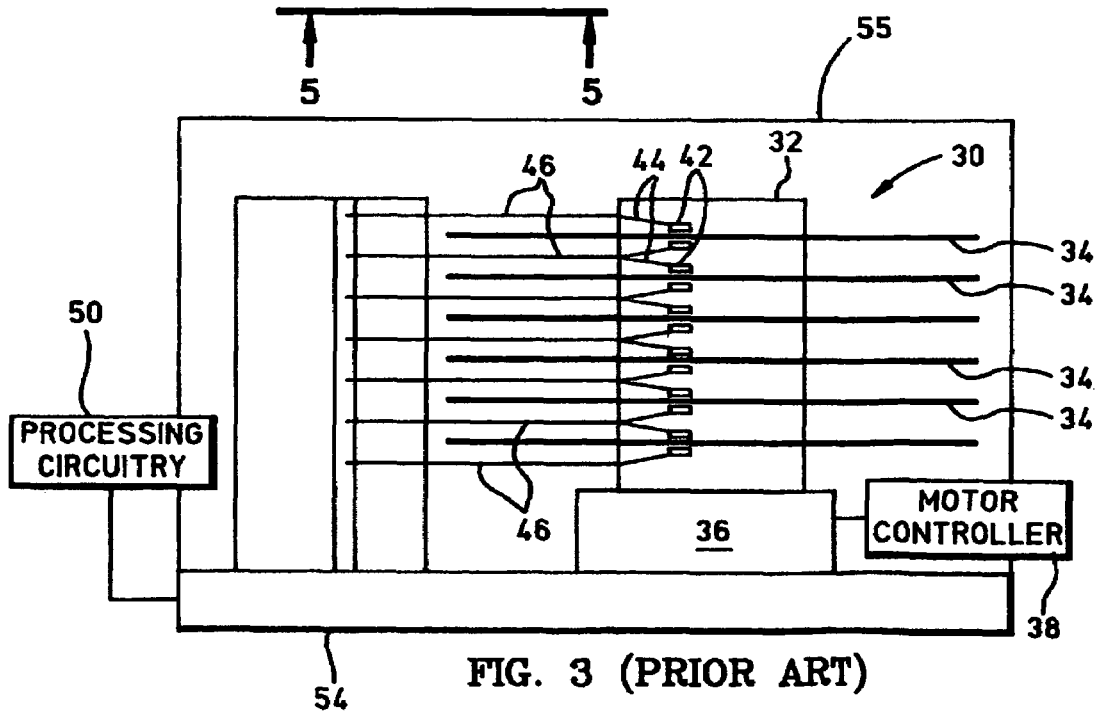
FIG. 3 is an elevation view of the magnetic disk drive wherein multiple disks and magnetic heads are employed.
Figure 4:
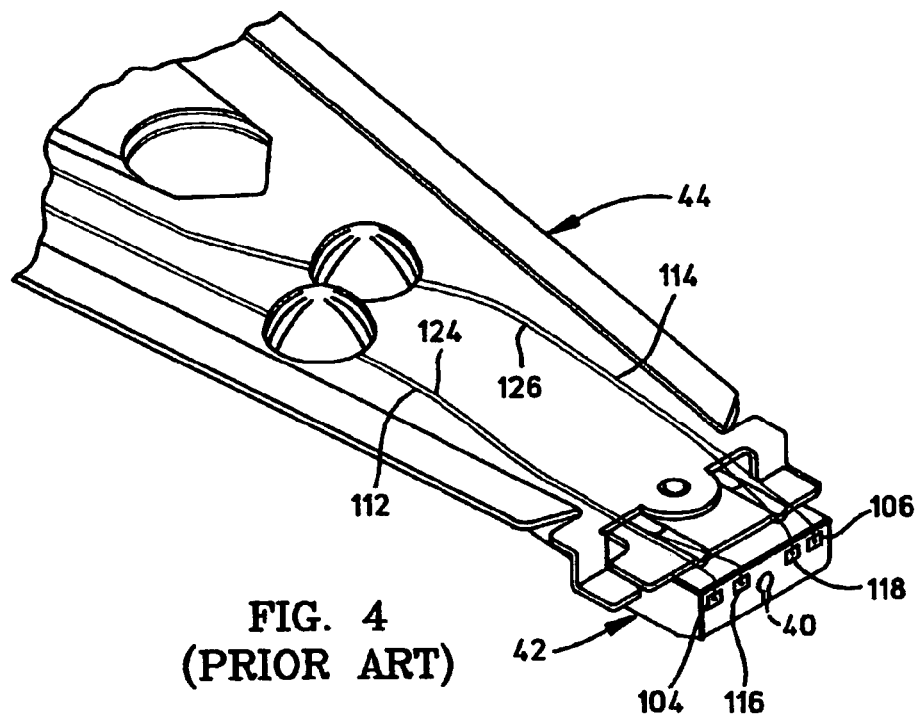
FIG. 4 is an isometric illustration of an exemplary prior art suspension system for supporting the slider and magnetic head.

Referring now to the drawings wherein like reference numerals designate like or similar parts throughout the several views, FIGS. 1-3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
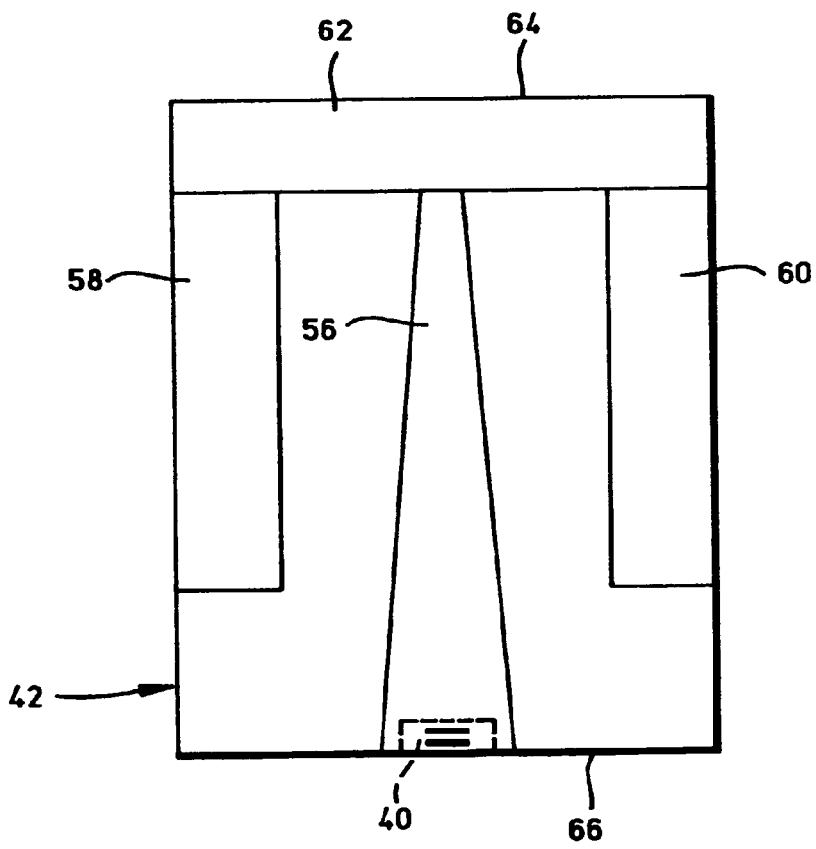
FIG. 5 is an ABS view of the magnetic head taken along plane 5-5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
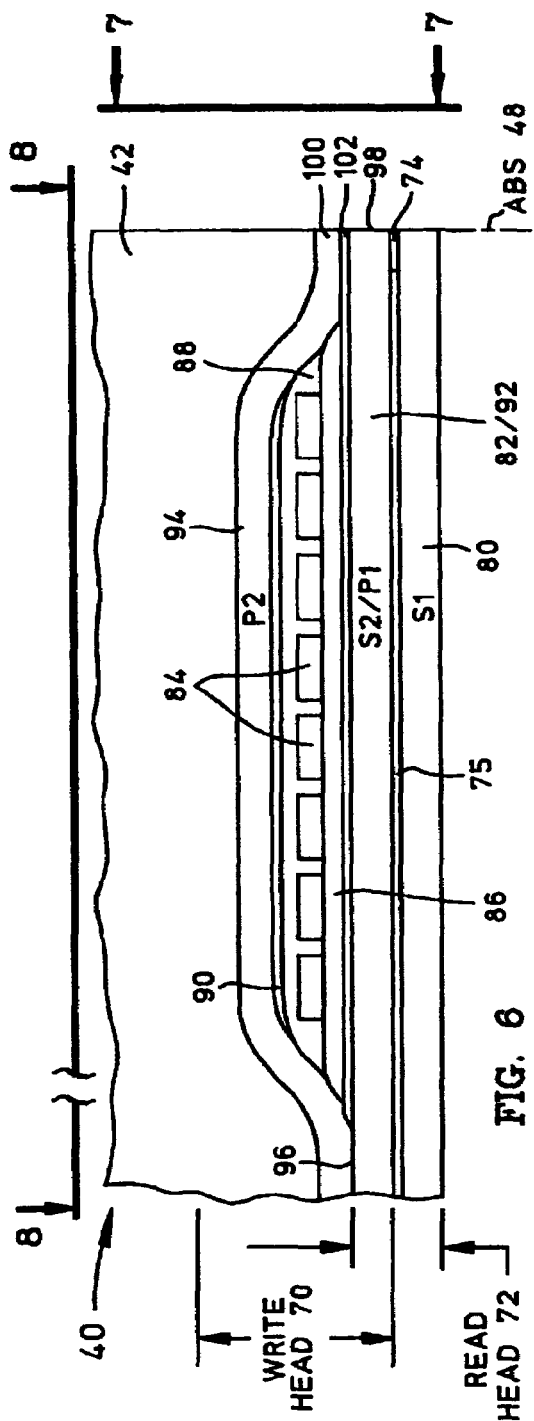
FIG. 6 is a partial view of the slider and a merged magnetic head as seen in plane 6-6 of FIG. 2.
Figure 7:
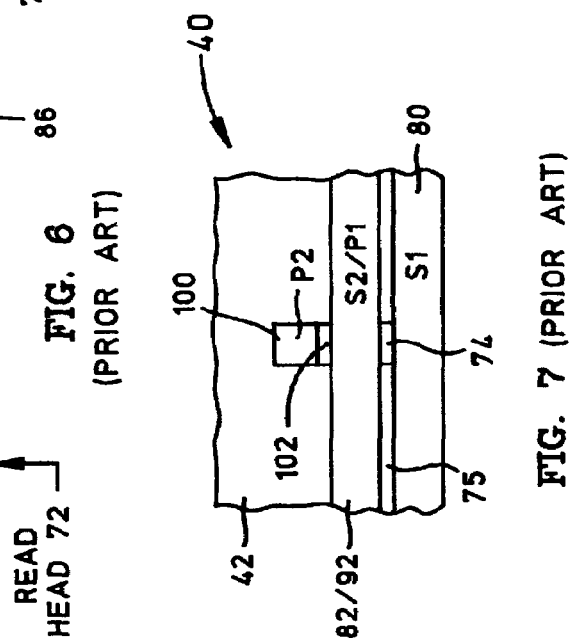
FIG. 7 is a partial ABS view of the slider taken along plane 7-7 of FIG. 6 to show the read and write elements of the magnetic head.

FIG. 6 is a side cross-sectional elevation view of a merged magnetic head 40, which includes a write head portion 70 and a read head portion 72, the read head portion employing a CPP sensor 74. FIG. 7 is an ABS view of FIG. 6. The CPP sensor 74 is sandwiched between ferromagnetic first and second shield layers 80 and 82 which may serve as first and second leads connected to the processing circuitry 50 in FIG. 3 for conducting a perpendicular current $I_p$ through the sensor perpendicular to major planes of the layers of the sensor. In response to external magnetic fields, the resistance of the sensor 74 changes. When the current $I_p$ is conducted through the sensor the resistance changes cause potential changes which are processed as readback signals by the processing circuitry 50 shown in FIG. 3.

Figure 8:
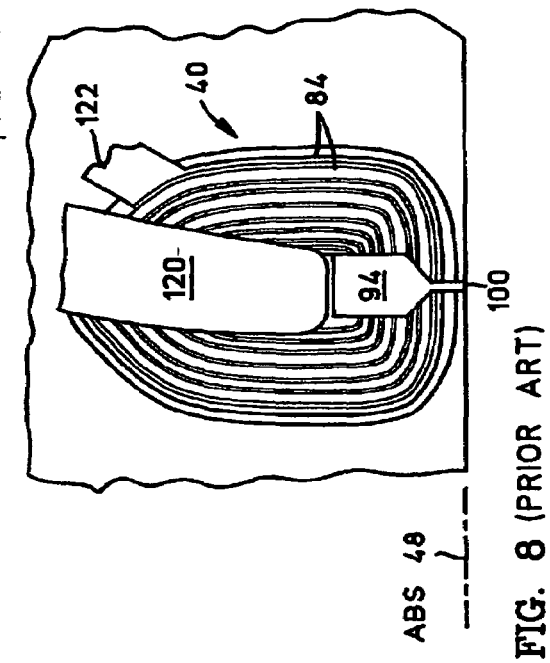
FIG. 8 is a view taken along plane 8-8 of FIG. 6 with all material above the coil layer and leads removed.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
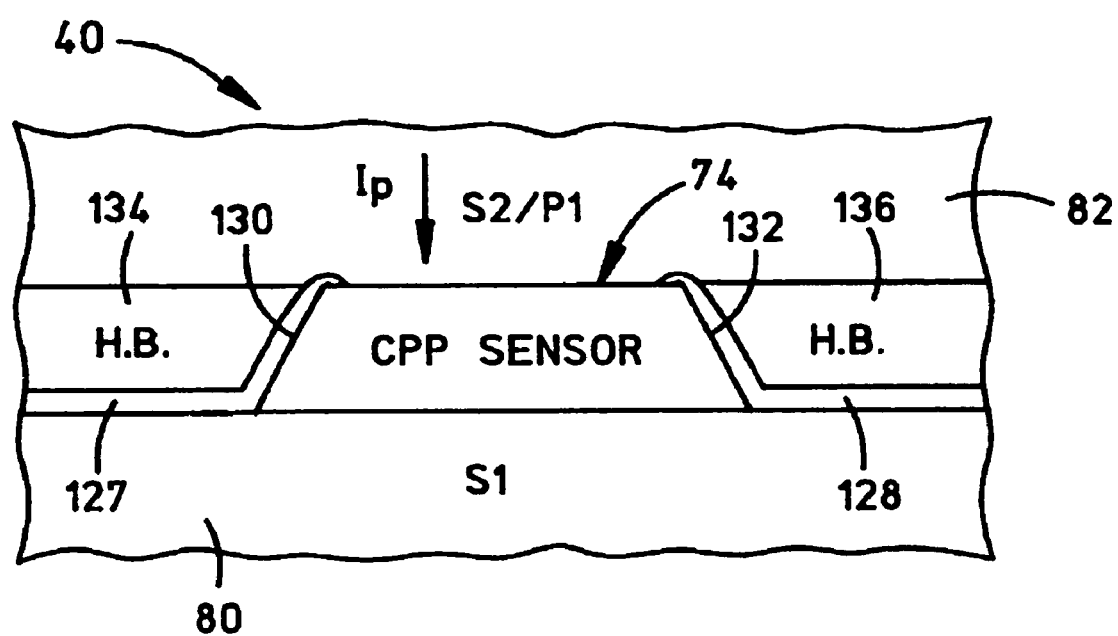
FIG. 9 is an enlarged isometric ABS illustration of a magnetic head having a current-perpendicular-to-the-planes (CPP) type sensor.

FIG. 9 is an enlarged isometric ABS illustration of the prior art read head portion shown in FIG. 7. The read head includes the CPP sensor 74. First and second insulation layers 127 and 128, such as alumina, cover the first shield layer 80 on each side of the sensor 74 as well as slightly covering first and second side walls 130 and 132 of the sensor. First and second hard bias layers (HB) 134 and 136 are on the insulation layers 127 and 128 and are adjacent the side walls 130 and 132. The hard bias layers 134 and 136 cause magnetic fields to extend longitudinally through the sensor 74 for stabilizing the free layer. The sensor 74 and the first and second hard bias layers 134 and 136 are located between ferromagnetic first and second shield layers 80 and 82 which may serve as leads for conducting the perpendicular current $I_p$ through the sensor 74.

Figure 10:
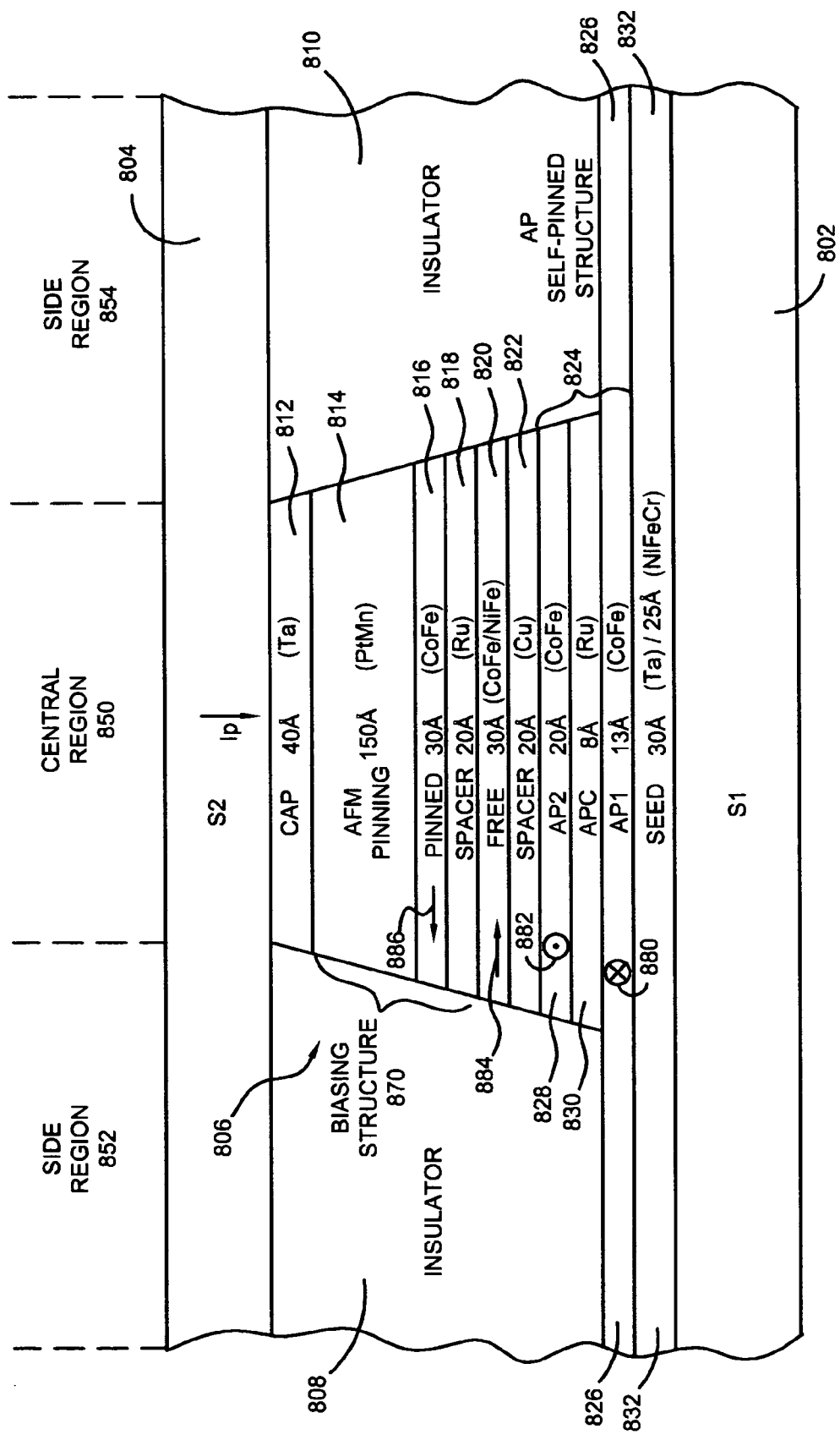
FIG. 10 is a partial close-up ABS view of a read element of the magnetic head according to the present application, showing a first antiparallel (AP) self-pinned layer formed in both a central region and in side regions adjacent the central region.

FIG. 10 is a partial close-up ABS view of a read element of the magnetic head according to the present application. This read element may be utilized in the slider and disk drive shown and described above in relation to FIGS. 1-8. The read element includes a read sensor structure 806 which is formed between and in contact with lower and upper shield layers 802 and 804. Read sensor structure 806 is primarily formed in a central region 850, in between left and right side regions 852 and 854 which are located adjacent central region 850. Insulator layers 808 and 810 are formed adjacent read sensor structure 806 in side regions 852 and 854, respectively, also in between lower and upper shield layers 802 and 804.

Read sensor structure 806 includes, from bottom to top, a seed layer structure 832, an antiparallel (AP) self-pinned structure 824, a non-magnetic material spacer layer 822, a free layer structure 820, an in-stack biasing structure 870, and a cap layer 812. In-stack biasing structure 870 is formed underneath cap layer 812 and over and adjacent free layer structure 820. AP self-pinned structure 824 is formed over seed layer structure 832, and spacer layer 822 is formed in between AP self-pinned structure 824 and free layer structure 820. Seed layer structure 832 is formed over lower shield layer 802 and underneath AP self-pinned structure 824 for promoting an improved texture of the layers deposited thereon. Cap layer 812, in-stack biasing structure 870, free layer structure 820, spacer layer 822, AP self-pinned layer 828, and APC layer 830 are formed only in central region 850 and do not extend within side regions 852 and 854. Seed layer structure 832 is formed over lower shield layer 802 in both central region 850 and side regions 852 and 854.

The read element in FIG. 10 is preferably a current-perpendicular-to-the-planes (CPP) type spin valve sensor. Alternatively, the read element may be a tunnel valve sensor. In any case, lower and upper shield layers 802 and 804 serve as electrically conductive leads for read sensor structure 806. A perpendicular current $I_p$ is generated which flows from upper shield layer 804 to lower shield layer 802 through read sensor structure 806 in a direction that is perpendicular to the planes defined by the sensor layers. Since insulation layers 808 and 810 contact left and right sides of read sensor structure 806, the perpendicular current $I_p$ does not leak or escape through side regions 852 and 854 but rather flows primarily solely through central region 850 of read sensor structure 806.

AP self-pinned structure 824 includes a first AP self-pinned layer 826, a second AP self-pinned layer 828, and an AP coupling (APC) layer 830 formed between first and second AP self-pinned layers 826 and 828. AP self-pinned layers 826 and 828 have magnetic moments 880 and 882, respectively, which are oriented perpendicular to the ABS and antiparallel with respect to one another as indicated. Note that no AFM pinning layer in FIG. 10 is necessary for pinning in AP self-pinned structure 824. In a non-self-pinned type application, first AP pinned layer 826 is exchange coupled to a relatively thick AFM pinning layer formed below it which pins magnetic moment 880 of first AP pinned layer 826 perpendicular to the ABS in a direction into (or out of) the sensor. By strong antiparallel coupling between first and second AP pinned layers 826 and 828, magnetic moment 882 of second AP pinned layer 828 is made antiparallel to magnetic moment 880. A self-pinned read sensor 806 of the present application, however, relies on magnetostriction of AP self-pinned structure 824 as well as ABS stress for a self-pinning effect. An AFM pinning layer, which is typically as thick as 150 Angstroms, is not necessary for pinning and therefore a relatively thin sensor can be fabricated.

Free layer structure 820 has a magnetic moment 884 which is parallel to the ABS and parallel to the major planes of the sensor, in a direction from right to left (or from left to right) as shown in FIG. 10. When a field signal from the rotating magnetic disk rotates magnetic moment 884 into the sensor, magnetic moments 884 and 882 become more antiparallel which increases the resistance of the sensor to the perpendicular current $I_p$. When a field signal rotates magnetic moment 884 out of the sensor, magnetic moments 884 and 882 become more parallel which decreases the resistance of the sensor to the perpendicular current $I_p$. These resistance changes cause potential changes within processing circuitry 50 in FIG. 3 which are processed as playback signals. Preferably, free layer structure 820 includes at least first and second free layers. The first free layer may be nickel-iron (NiFe) and the second free layer may be cobalt-iron (CoFe), with the first free layer interfacing spacer layer 818 for improving the magneto resistive coefficient Δr/R of the sensor.

Preferably, biasing structure 870 is included in central region 850. This "in-stack" biasing structure 870 includes an antiferromagnetic (AFM) pinning layer 814, a ferromagnetic (FM) pinned layer 816, and a non-magnetic material spacer layer 818. In-stack biasing structure 870 is located in central region 850 within the track width for longitudinally biasing magnetic moment 884 of free layer structure 820. AFM pinning layer 814 interfaces and is exchange coupled to pinned layer 816 for pinning a magnetic moment 886 of pinned layer 816 parallel to the ABS and parallel to the planes of the layers of the sensor as indicated. Spacer layer 818 causes pinned layer 816 and free layer structure 820 to be magnetostatically and AP coupled for stabilizing magnetic moment 884 of free layer structure 820 parallel to the ABS and parallel to the major planes of the sensor as indicated. This biasing is uniform from the sides of free layer structure 820 so that the biasing does not cause a limitation on narrow track width sensors.

Exemplary thicknesses and materials of the layers for a CPP sensor are shown in FIG. 10. Note that spacer layer 818 of biasing structure 870 may alternatively be tantalum (Ta) or a bilayer of tantalum/ruthenium (Ta/Ru) instead of ruthenium (Ru). Note that spacer layer 822 between AP self-pinned structure 824 and free layer structure 820 may be either aluminum-oxide ($Al_2O_3$) or copper (Cu). When spacer layer 822 is aluminum-oxide ($Al_2O_3$) (or even magnesium-oxide (MgO)), the sensor may be employed as a tunneling CPP sensor; when spacer layer 822 is copper (Cu), the sensor may be employed as a CPP spin valve sensor. The invention is applicable to either type of these sensors. If the sensor is a tunneling CPP sensor, the following additional materials may be substituted for the materials shown in FIG. 10: pinned layer 816 may be iron (Fe) instead of cobalt-iron (CoFe); spacer layer 818 may be chromium (Cr) instead of ruthenium (Ru); the first free layer may be iron (Fe) instead of cobalt-iron (CoFe); second AP self-pinned layer 828 may be iron (Fe) instead of cobalt-iron (CoFe); and APC layer 830 may be chromium (Cr) instead of ruthenium (Ru). It should be understood that either of the sensors may be a top-type CPP sensor instead of a bottom-type CPP sensor as shown. In a top-type CPP sensor, the layers shown in FIG. 10 are inverted except for cap layer 812 and seed layer structure 832. Further, either of the sensors may be employed in the read head 40 shown in FIG. 6 and the magnetic disk drive shown in FIG. 3.

Note that for self-pinned sensors it has been necessary to improve the magnetic pinning field in order to prevent amplitude flipping. During disk drive operation, readback signals from the disk are detected as either a "0" or "1" depending on the polarity of the bits recorded on the disk. When an undesirable head-to-disk interaction occurs (e.g. from defects, asperities, bumps, etc.), the sensor experiences compressive or tensile stress which may cause the pinned layers to flip orientation. Electrical overstress (EOS) from electrostatic discharge (ESD) in the sensor during manufacturing and/or handling may also induce such flipping. If the sensor is of the CPP type, current flows through the sensor in a direction that is perpendicular to the layers which increases the sensor's temperature, to thereby produce a source of thermal stress which further contributes to the likelihood of amplitude flip. Due to these sources of stress, the pinned layers may flip their direction either permanently or semi-permanently depending on the severity of the stress. This causes the amplitude of the readback signal to flip (hence the terminology "amplitude flip"), which results in corrupt data.

In accordance with the present application, first AP self-pinned layer 826 is formed in both central region 850 and in side regions 852 and 854 as shown in FIG. 10. See also the top down view of first AP self-pinned layer 826 in FIG. 11 along with the view of FIG. 10. In side regions 852 and 854, first AP self-pinned layer 826 is formed underneath insulator layers 808 and 810 and over seed layer structure 832. Seed layer structure 832 is also formed in both central region 850 and in side regions 852 and 854.

The extension of first AP self-pinned layer 826 in side regions 852 and 854 increases the volume of materials utilized for AP self-pinned layer 826. The current flows from upper shield layer 804 to lower shield layer 802 through read sensor structure 806 including first AP self-pinned layer 826 in side regions 852 and 854. Since thermal stability of first AP self-pinned layer 826 is proportional to its volume, extending first AP self-pinned layer 826 in side regions 852 and 854 improves the thermal stability to thereby reduce stress and the likelihood of amplitude flip. In addition, extending first AP self-pinned layer 826 into side regions 852 and 854 also improves Δr/R, as R from first AP self-pinned layer 826 (and e.g. seed layer structure 832) is reduced due to the increased cross-sectional area of these layers.

Figure 11:
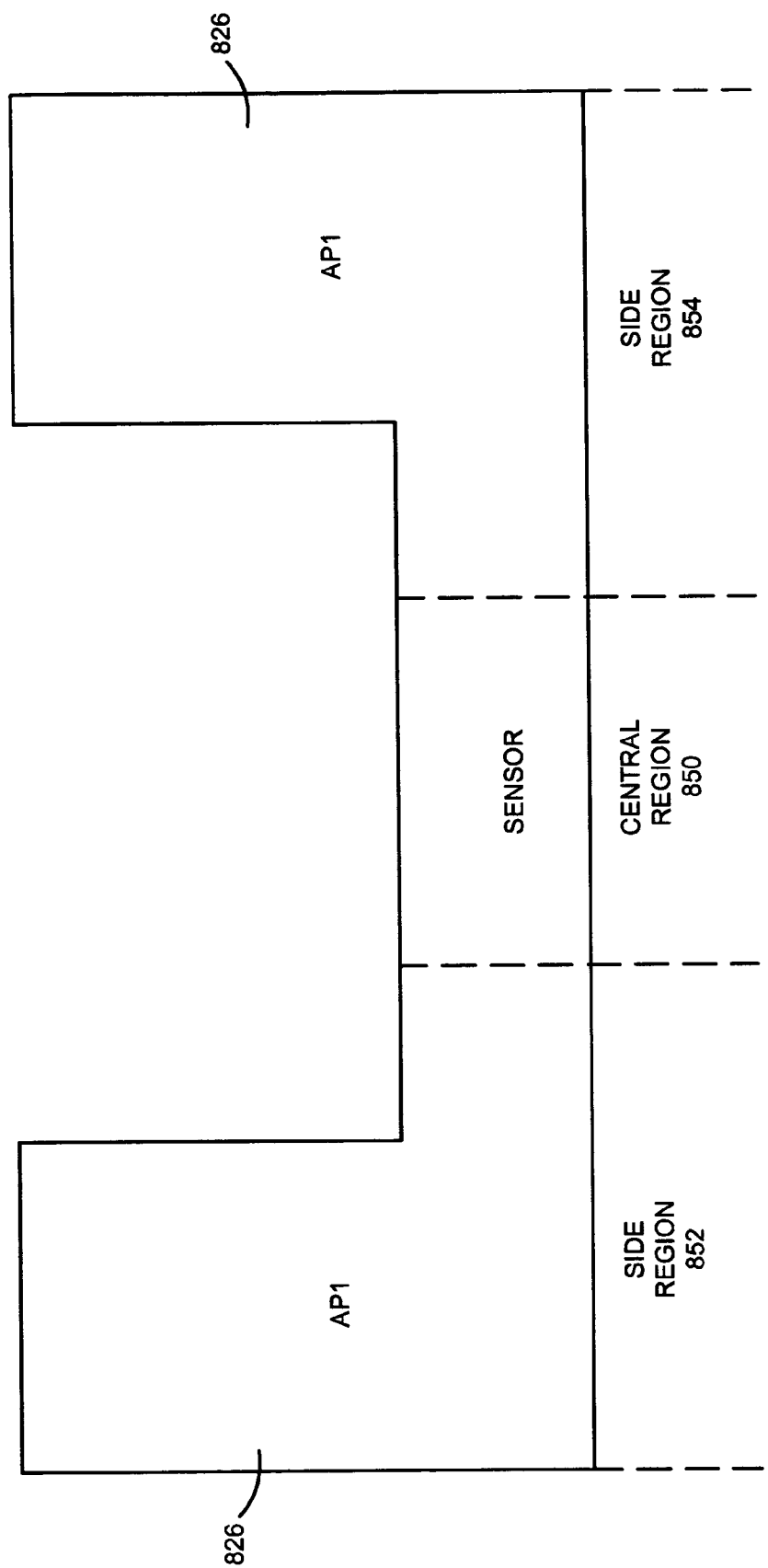
FIG. 11 is a top down view of the read element of FIG. 10 over the first AP self-pinned layer in both the central region and in the side regions.

Referring specifically now to FIG. 11, an example of the difference in the top surface area of central region 850 and the top surface area of side regions 852 and 854 where the first AP self-pinned layer 826 is extended is illustrated. In this embodiment, first AP self-pinned layer 826 is formed over the same etched location in side regions 852 and 854 as insulator materials 808 and 810 (FIG. 10). The increase in surface area from first AP self-pinned layer 826 being formed only in central region 850 to being formed in both central region 850 and in side regions 852 and 854 is preferably greater than 100%, and may be between about 100-500%. The thickness of first AP self-pinned layer 826 is preferably about 30 Angstroms, but more generally may be between about 20-40 Angstroms. With given thicknesses, the increase in volume from first AP self-pinned layer 826 being formed only in central region 850 to being formed in both central region 850 and side regions 852 and 852 is preferably greater than 100%, and may be between about 100-500%.

Figure 12:
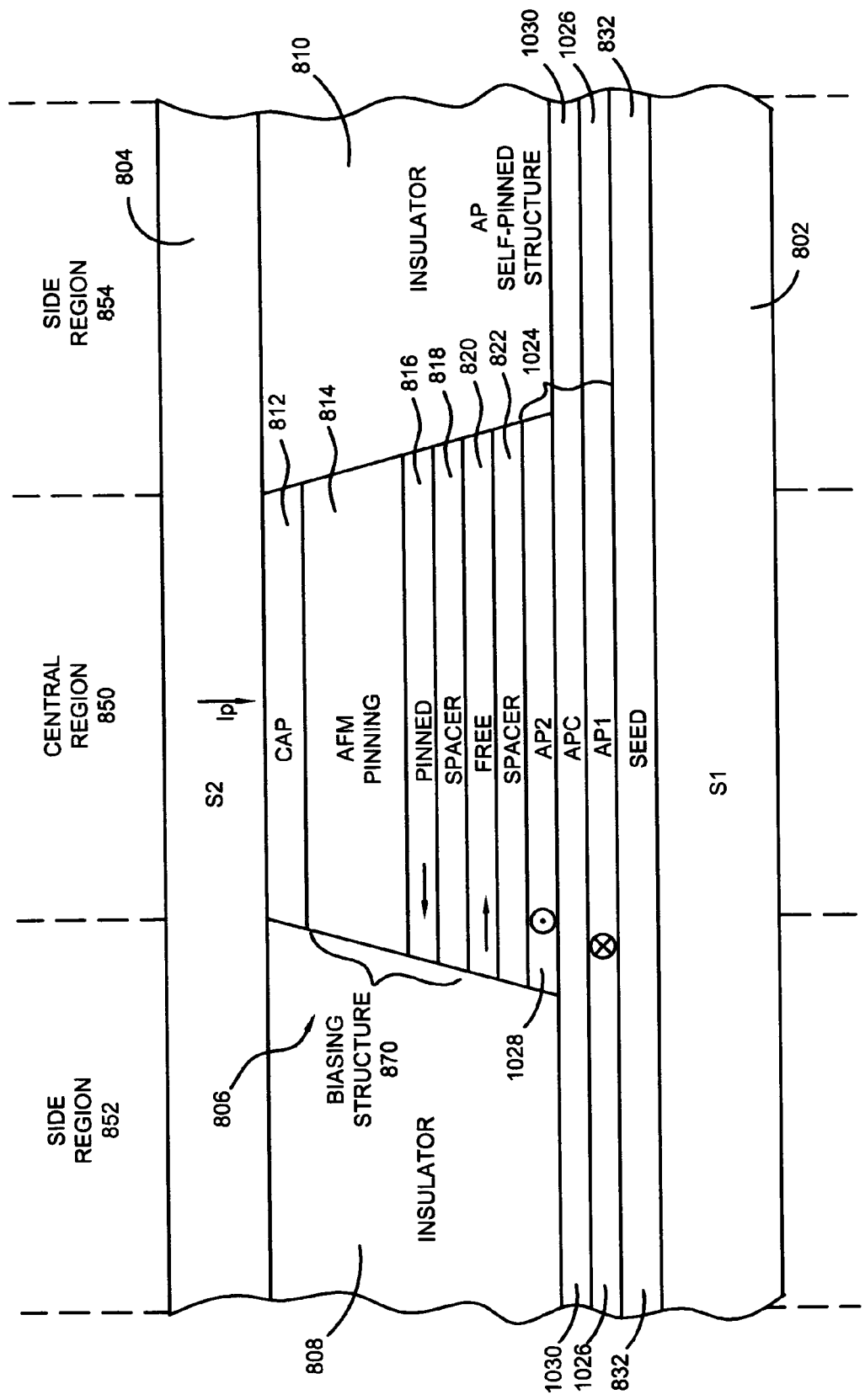
FIG. 12 is a partial close-up ABS view of another read element of the present application in a first alternate embodiment, which is the same as that shown and described in relation to FIGS. 10-11 except that both the first AP self-pinned layer and an antiparallel coupling (APC) layer of the AP self-pinned structure are formed in both the central region and the side regions.

FIG. 12 is a partial close-up ABS view of another read element of the present application in a first alternate embodiment. The read element of FIG. 12 is the same as that shown and described in relation to FIGS. 10-11, except that the read element of FIG. 12 includes an AP self-pinned structure 1024 having both a first AP self-pinned layer 1026 and an APC layer 1030 formed in both central region 850 and in side regions 852 and 854. A second AP self-pinned layer 1028 of AP self-pinned structure 1024 is formed only in central region 850 over APC layer 1030. First AP self-pinned layer 1026 and APC layer 1030 are both electrically conductive materials, as described above. Use of APC layer 1030 in side regions 852 and 854 serves to further increase the volume of conductive materials so as to further increase the thermal stability. Use of APC layer 1030 in side regions 852 and 854 is also preferred as it serves as a good barrier to oxygen. Specifically, APC layer 1030 in side regions 852 and 854 prevents first AP self-pinned layer 1026 from becoming oxidized in side regions 852 and 854 during the manufacture of the read element. In a variation to that shown and described in relation to FIG. 12, second AP self-pinned layer 1028 may also be extended into side regions 852 and 854 (i.e. like first AP self-pinned layer 1024 and APC layer 1030) where its top surface is optionally oxidized by exposure to open air.

Figure 13:
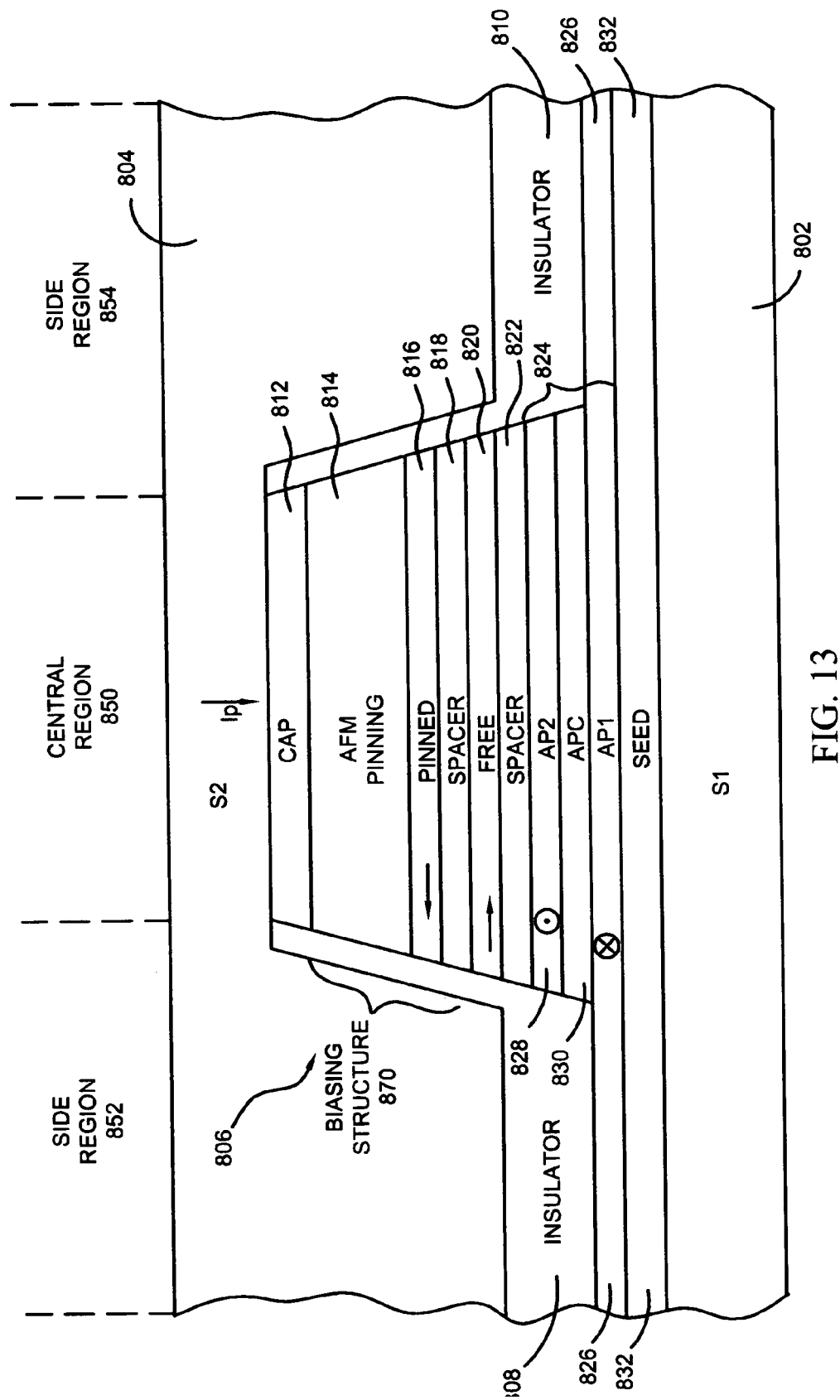
FIG. 13 is a partial close-up ABS view of yet another read element of the present application in a second alternate embodiment, which is the same as that shown and described in relation to FIGS. 10-11 (or FIG. 12) except that an upper shield layer is formed within voids of the side regions so as to surround left and right sides of the read sensor.

FIG. 13 is a partial close-up ABS view of yet another read element of the present application in a second alternate embodiment. The read element of FIG. 13 is the same as that shown and described in relation to FIGS. 10-11 except that shield layer 804 is partially formed within voids in side regions 852 and 854 so as to surround left and right sides of read sensor structure 806. Here, insulator layers 808 and 810 are formed thinly between shield layer 804 and the left and right sides of read sensor structure 806 so that current is not shunted through shield layer 804 from the left and right sides. This read element configuration may be preferred if it is desirable to protect a larger portion of read sensor structure 806 with shield layer 804. This same approach may be utilized in combination with the read element shown and described in relation to FIG. 12 where more than one of the AP self-pinned layers are formed in the side regions.

Figure 14:
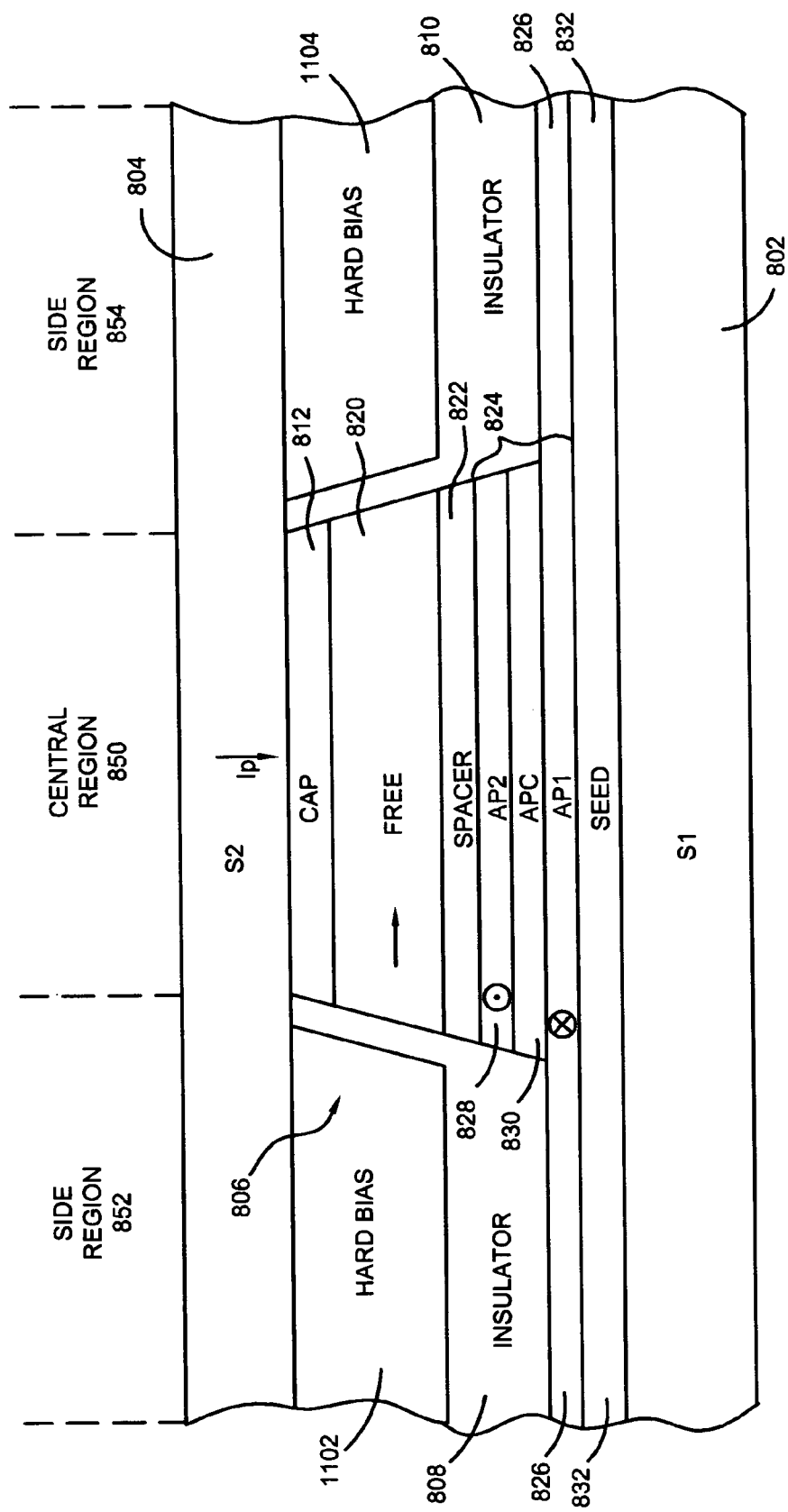
FIG. 14 is a partial close-up ABS view of even another read element of the present application in a third alternate embodiment, which is the same as that shown and described in relation to FIGS. 10-11 (or FIG. 12) except that the in-stack biasing structure is removed and hard bias layers are formed in the side regions.

FIG. 14 is a partial close-up ABS view of even another read element of the present application in a third alternate embodiment. The read element of FIG. 14 is the same as that shown and described in relation to FIGS. 10-11, except that the read element of FIG. 14 does not have the in-stack hard bias layer in central region 850. Rather, the read element of FIG. 14 has hard bias layers 1102 and 1104 formed in side regions 852 and 854, respectively. In particular, hard bias layers 1102 and 1104 are formed over insulator layers 808 and 810 in side regions 852 and 854, respectively, which have a reduced thickness compared to FIG. 10. Insulator layers 808 and 810 are also formed thinly between hard bias layers 1102 and 1104 and the left and right sides of read sensor structure 806 so that current is not shunted through hard bias layers 1102 and 1104 from the left and right sides. Shield layer 804 is formed directly over hard bias layers 1102 and 1104 in side regions 852 and 854, respectively, and over capping layer 812 in central region 850. As apparent, hard bias layers 1102 and 1104 and are aligned with free layer structure 820 for longitudinally biasing the same. This same approach of FIG. 14 may be utilized in combination with the read element shown and described in relation to FIG. 12 where more than one of the AP self-pinned layers are formed in the side regions.

Methods of making of such a read sensor will now be described, with reference to the sensor shown and described in relation to FIGS. 10-11. To begin, a lower shield layer which will also serve as a first electrically conducting lead for the sensor is formed on a surface of a wafer. A plurality of read sensor layers are then deposited in full film over the lower shield/lead layer. The plurality of read sensors layers deposited include, from bottom to top, a seed layer structure, an AP self-pinned layer structure, a material spacer layer, a free layer structure, an in-stack biasing structure, and a cap layer. Next, a central resist is formed over the read sensor layers in the central region. With the central resist in place, ion milling is performed such that read sensor materials are removed in the side regions. The ion milling is performed until the first AP self-pinned layer of the AP self-pinned structure is reached, when the ion milling is stopped. From the ion milling, a central read sensor structure is formed generally underneath the central resist. However the first AP pinned layer and the seed layer structure are formed in the central and side regions. With the central resist still in place, insulator materials are deposited over the structure such that insulator layers are formed in the side regions adjacent the central read structure. A planarization process such as a chemical-mechanical polishing (CMP) may be used to planarize the top surface of the central read sensor and the insulator layers. Finally, an upper shield layer which will also serve as a second electrically conducting lead for the sensor is then formed over the planarized top surface of the structure. The resulting structure is shown in FIGS. 10-11.

To form the structure of FIG. 11 the ion milling is performed until the APC layer is reached, when the ion milling is stopped. As apparent, keeping the APC layer in the side regions prevents the AP self-pinned layer from becoming oxidized in the side regions during the manufacturing process of the read element. Otherwise, it would be exposed to open air or oxygen which would adversely affect its magnetic moment and perhaps its electrically conducting properties. Alternatively, the ion milling is performed partially through the second AP self-pinned layer when the ion milling is stopped. In this latter case, the second AP self-pinned layer may thereafter be intentionally exposed to oxygen to sufficiently oxidize it so that it cannot effectively electrically conduct current and to destroy or significant reduces its magnetic moment. This alternative method would result in the entire AP self-pinned structure being formed in both the central region and the side regions, with the magnetic moment and electrically conductive properties of the second AP self-pinned structure being destroyed in the side regions.

Final Comments. As described herein, a magnetic head includes first and second shield layers and a read sensor formed between and in electrical contact with the first and second shield layers, where the read sensor is of the current-perpendicular-to-the-planes (CPP) type or tunnel valve type. The read sensor includes a free layer structure; an antiparallel (AP) self-pinned structure which includes a first AP self-pinned layer, a second AP self-pinned layer, and an AP coupling layer formed between the first and the second AP self-pinned layers; and a non-magnetic spacer layer formed between the free layer structure and the AP self-pinned structure. The first AP self-pinned layer is formed in both a central region of the read sensor and in side regions adjacent the central region. Since thermal stability of the first AP self-pinned layer is proportional to its volume, extending the first AP self-pinned layer in the side regions improves the thermal stability to reduce the likelihood of amplitude flip in the self-pinned sensor. Preferably, an in-stack biasing structure is formed in the central region for stabilizing the free layer structure. The in-stack biasing structure includes an antiferromagnetic (AFM) pinning layer; a pinned layer formed adjacent the AFM pinning layer; and a spacer layer formed between the pinned layer and the free layer structure.

A disk drive of the present application includes a housing; a magnetic disk rotatably supported in the housing; a magnetic head; a support mounted in the housing for supporting the magnetic head so as to be in a transducing relationship with the magnetic disk; a spindle motor for rotating the magnetic disk; an actuator connected to the support for moving the magnetic head to multiple positions with respect to said magnetic disk; a processor connected to the magnetic head, to the spindle motor, and to the actuator for exchanging signals with the magnetic head for controlling movement of the magnetic disk and for controlling the position of the magnetic head; the magnetic head including first and second shield layers; a read sensor formed in between and in electrical contact with the first and the second shield layers which also serve as electrically conductive leads for the read sensor; the read sensor including a free layer structure; an antiparallel (AP) self-pinned structure; a non-magnetic spacer layer formed between the free layer structure and the AP self-pinned structure; and a first AP self-pinned layer of the AP self-pinned structure formed in both a central region of the read sensor and in side regions adjacent the central region. Since thermal stability of the first AP self-pinned layer is proportional to its volume, extending the first AP self-pinned layer in the side regions improves the thermal stability to reduce the likelihood of amplitude flip.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A read sensor, comprising:
a capping layer having side edges which define boundaries of a central region of the read sensor;
a free layer structure formed in the central region but substantially absent from side regions adjacent the central region;
an antiparallel (AP) self-pinned structure which is pinned by means of magnetostriction and air bearing surface (ABS) stress, such that the read sensor has no antiferromagnetic (AFM) pinning layer for pinning the AP self-pinned structure;
a non-magnetic spacer layer formed between the free layer structure and the AP self-pinned structure;
the AP self-pinned structure including:
a first AP self-pinned layer formed in both the central region and the side regions;
a second AP self-pinned layer;
an antiparallel (AP) coupling (APC) layer formed between the first and the second AP self-pinned layers, and formed in both the central region and the side regions over the first AP self-pinned layer;
the first AP self-pinned layer and the APC layer each having a top surface area which is increased by greater than 100% from being formed in both the central region and the side regions as compared to being formed only in the central region; and
insulator layers formed in the side regions over the first AP self-pinned layer and the APC layer.

2. The read sensor of claim 1, which is a current-perpendicular-to-the-planes (CPP) type sensor.

3. The read sensor of claim 1, which is formed in between and in electrical contact with first and second shield layers which serve as leads for the read sensor.

4. The read sensor of claim 1, which is a tunnel valve sensor.

5. The read sensor of claim 1 wherein, with the first AP self-pinned layer and the APC layer being extended in the side regions, a thermal stability of the first AP self-pinned layer is increased.

6. The read sensor of claim 1, wherein the APC layer serves as an oxygen barrier to the first AP self-pinned layer in the side regions.

7. The read sensor of claim 1, wherein the first AP self-pinned layer has a volume which is increased by greater than 100% by being formed in both the central region and the side regions as compared to being formed only in the central region.

8. The read sensor of claim 1, further comprising:
the second AP self-pinned layer formed in both the central region and in the side regions; and the second AP self-pinned layer having a top oxidized surface in the side regions.

9. A magnetic head, comprising:
first and second shield layers;
a read sensor formed in between and in electrical contact with the first and the second shield layers;
the read sensor including:
a capping layer having side edges which define boundaries of a central region of the read sensor;
a free layer structure formed in the central region but substantially absent from side regions which are adjacent the central region;
an antiparallel (AP) self-pinned structure which is pinned by means of magnetostriction and air bearing surface (ABS) stress, such that the read sensor has no antiferromagnetic (AFM) pinning layer for pinning the AP self-pinned structure;
a non-magnetic spacer layer formed between the free layer structure and the AP self-pinned structure;
the AP self-pinned structure including:
a first AP self-pinned layer formed in both the central region and the side regions;
a second AP self-pinned layer;
an antiparallel (AP) coupling (APC) layer formed between the first and the second AP self-pinned layers, and formed in both the central region and the side regions over the first AP self-pinned layer;
the first AP self-pinned layer and the APC layer each having a top surface area which is increased by greater than 100% from being formed in both the central region and the side regions as compared to being formed only in the central region; and
insulator layers formed in the side regions over the first AP self-pinned layer and the APC layer.

10. The magnetic head of claim 9, wherein the read sensor is a current-perpendicular-to-the-planes (CPP) type sensor.

11. The magnetic head of claim 9, wherein the first and second shield layers serve as electrically conductive leads for the read sensor.

12. The magnetic head of claim 9, wherein the read sensor is a tunnel valve sensor.

13. The magnetic head of claim 9, wherein, with the first AP self-pinned layer and APC layer being extended in the side regions, a thermal stability of the first AP self-pinned layer is increased to thereby reduce a likelihood of amplitude flip.

14. The magnetic head of claim 9, wherein an increase in a volume of the first AP self-pinned layer from being formed only in the central region to being formed in both the central region and the side regions is greater than 100%.

15. The magnetic head of claim 9, wherein the APC layer serves as an oxygen barrier to the first AP self-pinned layer in the side regions.

16. The magnetic head of claim 9, further comprising:
the second AP self-pinned layer formed in both the central region and in the side regions.

17. A disk drive, comprising:
a housing;
a magnetic disk rotatably supported in the housing;
a magnetic head;
a support mounted in the housing for supporting the magnetic head so as to be in a transducing relationship with the magnetic disk;
a spindle motor for rotating the magnetic disk;
an actuator connected to the support for moving the magnetic head to multiple positions with respect to said magnetic disk;
a processor connected to the magnetic head, to the spindle motor, and to the actuator for exchanging signals with the magnetic head for controlling movement of the magnetic disk and for controlling the position of the magnetic head;
the magnetic head including:
first and second shield layers;
a read sensor formed in between and in electrical contact with the first and the second shield layers;
the read sensor including:
a capping layer having side edges which define boundaries of a central region of the read sensor;
a free layer structure formed in the central region but substantially absent from side regions which are adjacent the central region;
an antiparallel (AP) self-pinned structure which is pinned by means of magnetostriction and air bearing surface (ABS) stress, such that the read sensor has no antiferromagnetic (AFM) pinning layer for pinning the AP self-pinned structure;
a non-magnetic spacer layer formed between the free layer structure and the AP self-pinned structure;
the AP self-pinned structure including:
a first AP self-pinned layer formed in both the central region and the side regions;
a second AP self-pinned layer;
an antiparallel (AP) coupling (APC) layer formed between the first and the second AP self-pinned layers, and formed in both the central region and the side regions over the first AP self-pinned layer;
the first AP self-pinned layer and the APC layer each having a top surface area which is increased by greater than 100% from being formed in both the central region and the side regions as compared to being formed only in the central region; and
insulator layers formed in the side regions over the first AP self-pinned layer and the APC layer.

18. The disk drive of claim 17, wherein the read sensor is a current-perpendicular-to-the-planes (CPP) type sensor.

19. The disk drive of claim 17, wherein the first and the second shield layers serve as electrically conductive leads for the read sensor.

20. The disk drive of claim 17, wherein the read sensor is a tunnel valve sensor.

21. The disk drive of claim 17 wherein, with the first AP self-pinned layer and the APC layer being extended in the side regions, a thermal stability of the first AP self-pinned layer is increased.

22. The disk drive of claim 17, wherein, with the first AP self-pinned layer and the APC layer being extended in the side regions, a thermal stability of the first AP self-pinned layer is increased, and with the APC layer further serving as an oxygen barrier to the first AP self-pinned layer in the side regions.

23. The disk drive of claim 17, further comprising:
a seed layer structure formed below the AP self-pinned structure in both the central region and the side regions.

24. The disk drive of claim 17, wherein the first AP self-pinned layer has a volume which is increased by greater than 100% by being formed in both the central region and the side regions as compared to being formed only in the central region.

25. The disk drive of claim 17, wherein the second AP self-pinned layer is formed in both the central region and the side regions and has a top oxidized surface in the side regions.

* * * * *